(12) United States Patent
Gollungberg

(10) Patent No.: US 6,176,530 B1
(45) Date of Patent: Jan. 23, 2001

(54) DEVICE FOR UNDERRUN PROTECTION IN VEHICLES

(75) Inventor: Peter Gollungberg, Skärhamn (SE)

(73) Assignee: Volvo Lastvagnar AB (SE)

( * ) Notice: Under 35 U.S.C. 154(b), the term of this patent shall be extended for 0 days.

(21) Appl. No.: 09/380,556

(22) PCT Filed: Mar. 16, 1998

(86) PCT No.: PCT/SE98/00473

§ 371 Date: Sep. 2, 1999

§ 102(e) Date: Sep. 2, 1999

(87) PCT Pub. No.: WO98/41423

PCT Pub. Date: Sep. 24, 1998

(30) Foreign Application Priority Data

Mar. 14, 1997 (SE) ................................................ 9700916

(51) Int. Cl.⁷ .................................................. B60R 19/56
(52) U.S. Cl. ........................ 293/133; 293/129; 293/146; 293/155
(58) Field of Search .................................. 293/132, 133, 293/102, 123, 129, 146, 155, 103, 118, 119, 142

(56) References Cited

U.S. PATENT DOCUMENTS 1,424,395 * 8/1922 Evelyn ................................ 280/276
4,359,239   11/1982 Eggert, Jr. .

FOREIGN PATENT DOCUMENTS

| | | |
|---|---|---|
| 24 38 828 | 5/1987 | (DE) . |
| 259 822 A1 | 9/1988 | (DE) . |
| 41 03 782 | 8/1992 | (DE) . |
| 42 06 022 | 9/1993 | (DE) . |
| 2 095 630 | 10/1982 | (GB) . |
| 368 932 | 7/1974 | (SE) . |

* cited by examiner

Primary Examiner—D. Glenn Dayoan
Assistant Examiner—Patricia Engle
(74) Attorney, Agent, or Firm—Lerner, David, Littenberg, Krumholz & Mentlik, LLP

(57) ABSTRACT

Apparatus is dislosed for protecting vehicles including a crossbeam and a console mounting the crossbeam to the frame of the vehicle at a location which corresponds to the expected point of impact of a force generated by a collision, the console including an upper portion connected to the frame and comprising a hardened portion thereof, a lower portion comprising a non-hardened portion of the console, and a boundary area between these upper and lower portions comprising a weakened area of the console whereby upon impact the console is adapted to pivot about the weakened area for deformation of the console thereabout.

8 Claims, 3 Drawing Sheets

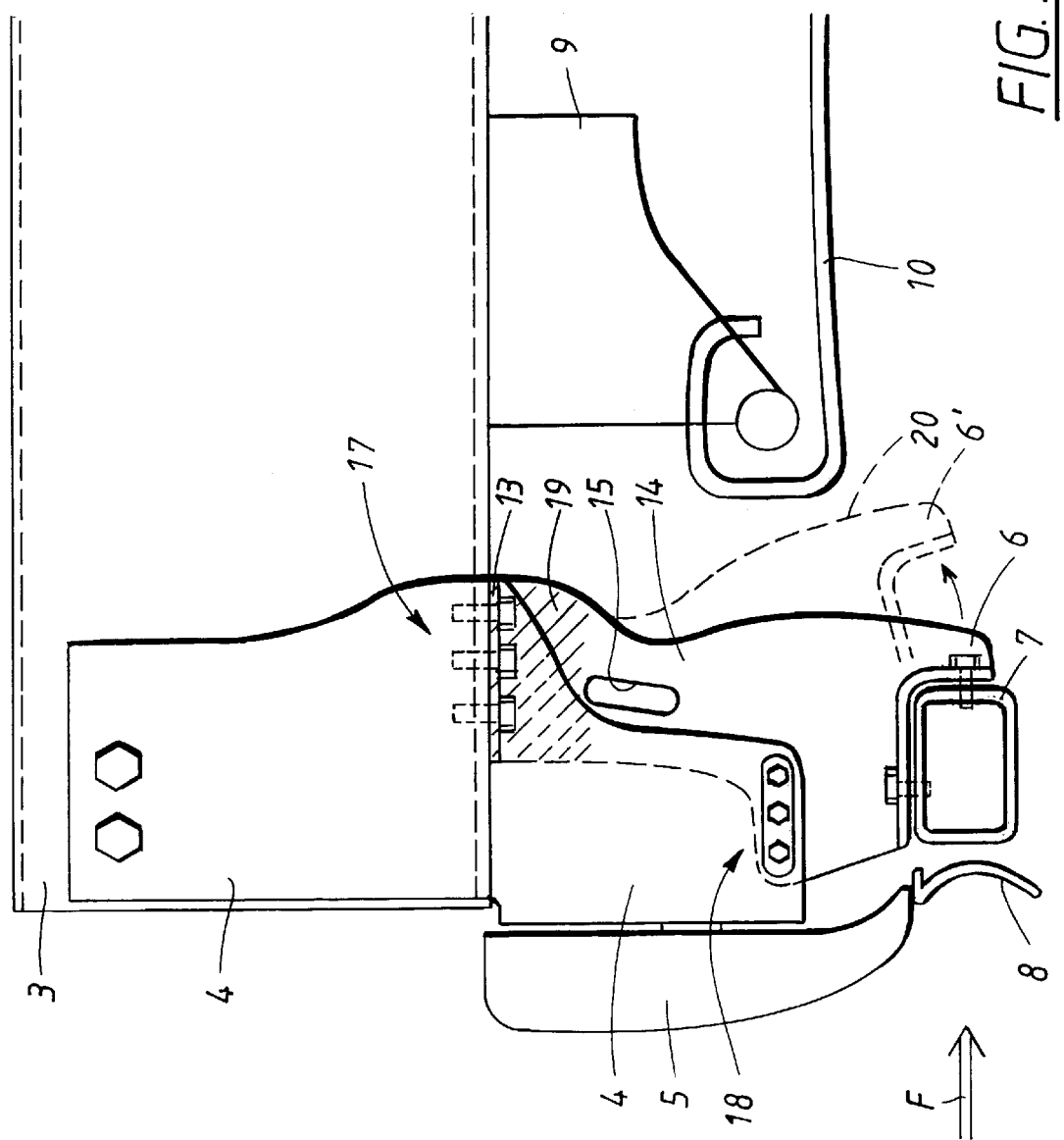

DEVICE FOR UNDERRUN PROTECTION IN VEHICLES

FIELD OF THE INVENTION

The present invention relates to a device for underrun protection of vehicles. More particularly, the invention is primarily intended to be applied to heavy cargo vehicles, in particular for preventing passenger vehicles from underrunning the cargo vehicle in the event of a head-on collision.

BACKGROUND OF THE INVENTION

Large motor vehicles, such as cargo vehicles, are presently built with a relatively high ground clearance. One of the major reasons for this is the need to use these vehicles on uneven surfaces. At the front of the vehicle, the ground clearance is normally on the order of about 40 to 50 cm.

The fact that a cargo vehicle normally has a relatively high ground clearance, however, poses a serious traffic safety risk. This is due to the fact that in the case of a head-on collision between a cargo vehicle and a passenger car, there is a risk that the front part of the passenger car will slide in under the front of the cargo vehicle and will thus be pinned between the road and the underside of the front of the cargo vehicle. This can cause the front of the cargo vehicle to penetrate into the passenger car with a great deal of force, which in turn can cause serious injuries to those travelling in the vehicle. In unfortunate cases, the cargo vehicle can even continue forward and run over the passenger car, which can, of course, cause even more serious injuries.

Various solutions have been devised in order to solve the above-mentioned problems. The cargo vehicle can be designed with a lowered front, i.e. a front in which the ground clearance is so low that there is no room for a passenger car to slide under the cargo vehicle and be pinned between the cargo vehicle and the road in the event of a collision. Such a solution, however, counteracts the above-mentioned desire for high ground clearance in order to facilitate driving on uneven terrain. A lowering of the ground clearance is thus not possible for many kinds of cargo vehicles.

Another solution to these problems is to provide the cargo vehicle with special underrun protection in the form of a reinforced structure, for example in the form of a horizontally arranged beam element in the front of the cargo vehicle. Using such an element, it is possible to prevent a passenger car from sliding under the front of the cargo vehicle. Additionally, such a reinforced structure can be so arranged that it becomes energy-absorbing, whereby the structure absorbs energy when strained. This further decreases the risk of serious injuries in the case of a possible collision.

A particular problem in connection with energy-absorbing underrun protections is, however, that it is difficult to direct the energy absorption in a controllable manner. Another problem results from expected legislation within the European Union, which defines threshold values for the stresses which an underrun protection must be able to withstand without exceeding a certain high degree of deformation. According to this legislation, such underrun protection must be able to withstand up to 16 tons of pressure without being deformed. In certain types of accidents, there can however be pressures of a considerably higher amplitude. There is thus a need for a device for underrun protection which can withstand higher pressures than these legislative demands.

A known underrun protection for cargo vehicles is shown in German patent document No. 4,103,782. This underrun protection comprises a shock-absorbing element which is arranged under the front bumper of a cargo vehicle. The shock-absorbing element can be arranged at a certain angle relative to the road. In the event of a collision with a passenger car, the bumper will be affected with a certain force, which will cause a link system to move the shock-absorbing element to a position which prevents the passenger car from sliding under the cargo vehicle.

Although this new design in principle provides good protection against underrunning of the passenger car, it has a drawback in that it comprises a large number of moving parts, which makes it unnecessarily complicated, and it creates a risk of degraded function. This solution additionally offers little possibility of directing the energy absorption in a controlled manner in the event of a collision.

Another known underrun protection for a vehicle is shown in Danish patent document No. 259,822. This system exhibits two essentially S-shaped attenuating elements, which are deformable, and which are arranged between a spring attachment of the vehicle and an underrun protection. In the event of a strain the attenuating elements are deformed, and thus absorb force.

The object of the present invention is thus to provide an improved underrun protection for cargo vehicles, which provides a reliable function, and which meets the demands made on energy absorption. In particular, an object of the present invention is to provide an underrun protection which provides a controlled energy absorption during stress.

SUMMARY OF THE INVENTION

In accordance with the present invention, these and other objects have now been realized by the invention of apparatus for the protection of vehicles having a front and a frame defining a longitudinal direction, the apparatus comprising an impact member and an energy-absorbing member mounting the impact member to the frame at a location corresponding to the expected point of impact of a force generated by a collision, the energy-absorbing member including an upper portion connected to the frame, the upper portion of the energy-absorbing member comprising a hardened portion of the energy-absorbing member, a lower portion comprising a non-hardened portion of the energy-absorbing member, and a boundary area between the upper portion and the lower portion, the boundary area comprising a weakened area of the energy-absorbing member whereby upon the impact the energy-absorbing member is adapted to pivot about the weakened area for deformation of the energy-absorbing member thereabout. Preferably, the weakened area has a predetermined configuration whereby the weakened area deforms only when impacted by a predetermined impact force.

In accordance with one embodiment of the apparatus of the present invention, the energy-absorbing member is adapted to pivot about the weakened area substantially longitudinally across the vehicle.

In accordance with another embodiment of the apparatus of the present invention, the energy-absorbing member comprises a console extending substantially vertically with respect to the vehicle, and the weakened area of the console comprises an aperture extending through the console.

In accordance with another embodiment of the apparatus of the present invention, the energy-absorbing member comprises boron steel.

In accordance with another embodiment of the apparatus of the present invention, the impact member comprises a crossbeam extending substantially across the front of the vehicle.

In accordance with another embodiment of the apparatus of the present invention, the apparatus includes a counteracting member mounted on the vehicle adjacent to the energy-absorbing member whereby upon a predetermined degree of the deformation the energy-absorbing member contacts the counteracting member. Preferably, the counteracting member comprises a spring attachment to the vehicle.

The present invention is intended for vehicles which comprise a frame structure and an impact element which is arranged on the vehicle in a position which corresponds to an expected force strain in the event of a collision. The present invention also comprises an energy-absorbing element which connects the frame to the impact element. The present invention is based on the energy-absorbing element being shaped with a weakened portion, which essentially constitutes a pivoting joint for deforming or bending of the element during such strain.

According to a preferred embodiment of the present invention, the energy-absorbing element is shaped so that it is only deformed during energy absorption if it is affected by a force which exceeds a predetermined threshold value. This threshold value can be chosen according to current legislation.

In a preferred embodiment of the present invention, the invention comprises a counteracting element, preferably in the form of an existing spring attachment in the vehicle. In the event of deformation, the energy-absorbing element can come into contact with the spring attachment, whereby extremely large forces are absorbed. The present invention can thus withstand larger forces than that of the planned legislation, without the risk of underrunning occurring.

BRIEF DESCRIPTION OF THE DRAWINGS

The present invention will be more fully appreciated with reference to the following detailed description, which, in turn, refers to the appended drawings, in which:

FIG. 3 is a side, elevational view showing the function of the present invention.

DETAILED DESCRIPTION

Figure 1:
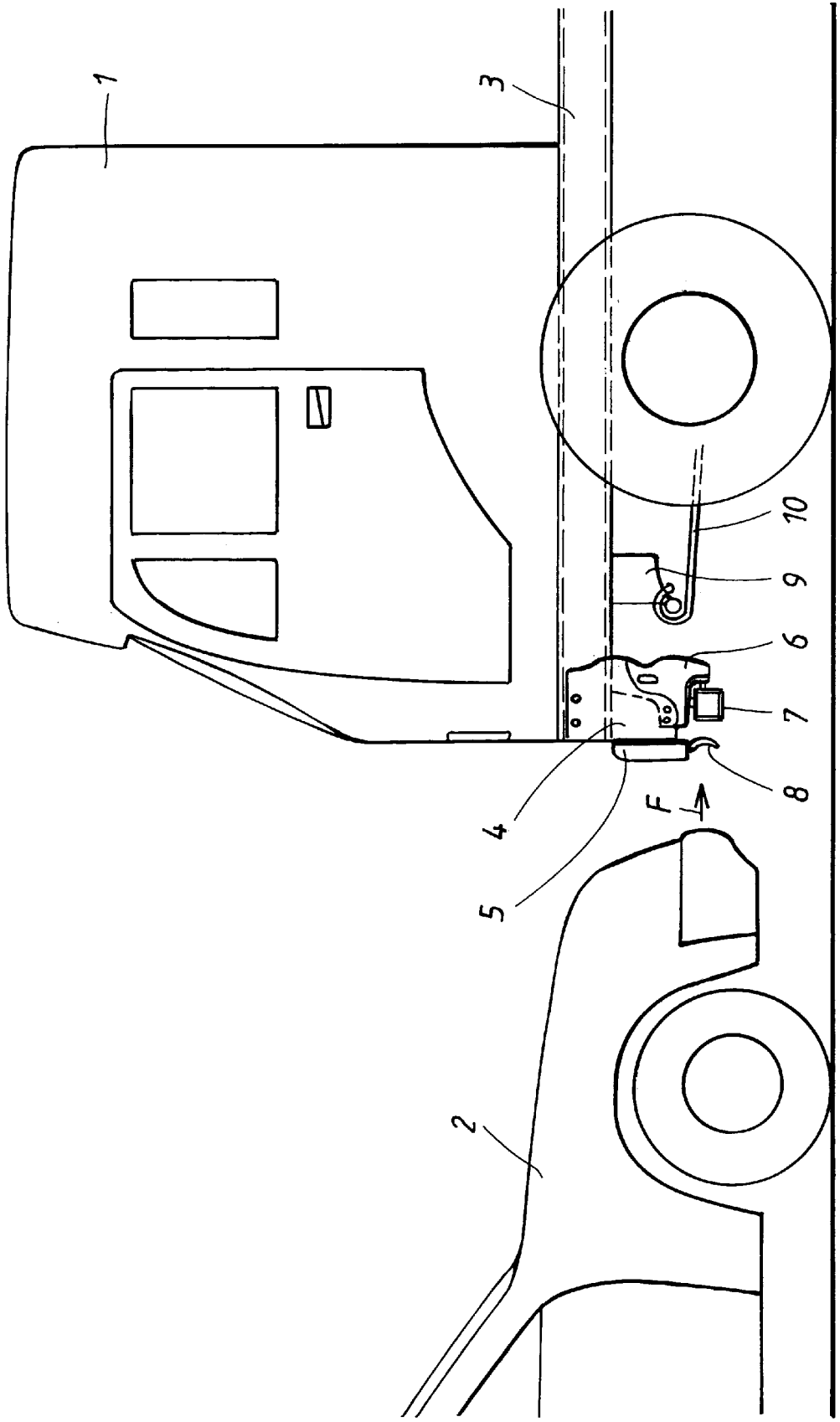
FIG. 1 is a side, elevational, partially schematic view as to how the present invention can be arranged in a cargo vehicle.

The present invention constitutes underrun protection which in particular, but not exclusively, is intended for use in cargo vehicles with a relatively high ground clearance. FIG. 1 is a somewhat simplified side view, which shows a cargo vehicle 1 which is provided with an arrangement according to the present invention. This figure also shows a passenger car 2. From the figure, it can be seen that a possible head-on collision between a passenger car and a cargo vehicle could lead to the passenger car being pinned down between the cargo vehicle and the road, which might cause serious injuries to those travelling in the passenger car 2. One of the main objects of the present invention is to prevent such situations from arising.

The cargo vehicle 1 is, in a conventional manner, provided with a frame which comprises two longitudinal frame beams, of which only one frame beam 3 can be seen in the drawing. The frame beam 3 essentially extends in the longitudinal direction of the vehicle 1, up to its front. In a preferred embodiment of the present invention, there are two chassis consoles 4 fixedly arranged at each frame beam 3, to be more exact at the front of each frame beam 3. The drawing, however, shows only one of the chassis consoles 4. Additionally, there is a bumper 5 arranged horizontally across the front of the cargo vehicle 1. The bumper 5 is supported by the chassis consoles 4.

According to the present invention, energy-absorbing means are provided in the form of two additional consoles 6 (of which only one console can be seen in FIG. 1) which are attached to both the frame beam 3 and the chassis console 4, and which connects these elements to each other. The consoles 6, which will be described in more detail below, constitute an impact element in the form of a beam 7 which extends essentially horizontally across the longitudinal extension of the vehicle 1. The crossbeam 7 has an essentially square (alternatively rectangular) cross-section and is arranged at a height over the road which corresponds to a predetermined ground clearance, preferably from about 35 to 40 cm. There is also a spoiler 8 fixedly arranged to the lower edge of the bumper 5. The spoiler 8 extends along the bumper 5 level with the crossbeam 7.

Each of the frame beams 3 is additionally connected to a molded console, which constitutes a spring attachment 9 for a spring 10. In a manner which as such is previously known, spring 10 constitutes a part of the wheel suspension of the cargo vehicle 1. The spring attachment 9 is essentially arranged in line with the energy-absorbing console 6, i.e. as seen in the longitudinal extension of the cargo vehicle 1.

As will be described in more detail below, the present invention functions in the following manner. In the event of a collision between the cargo vehicle 1 and the passenger car 2, the crossbeam 7 will be affected by a large force F. This force F will propagate to each of the consoles 6, which in a controlled manner can be deformed so that the force can be absorbed. At the same time, the passenger car 2 is prevented from sliding in between the cargo vehicle 1 and the road.

Figure 2:
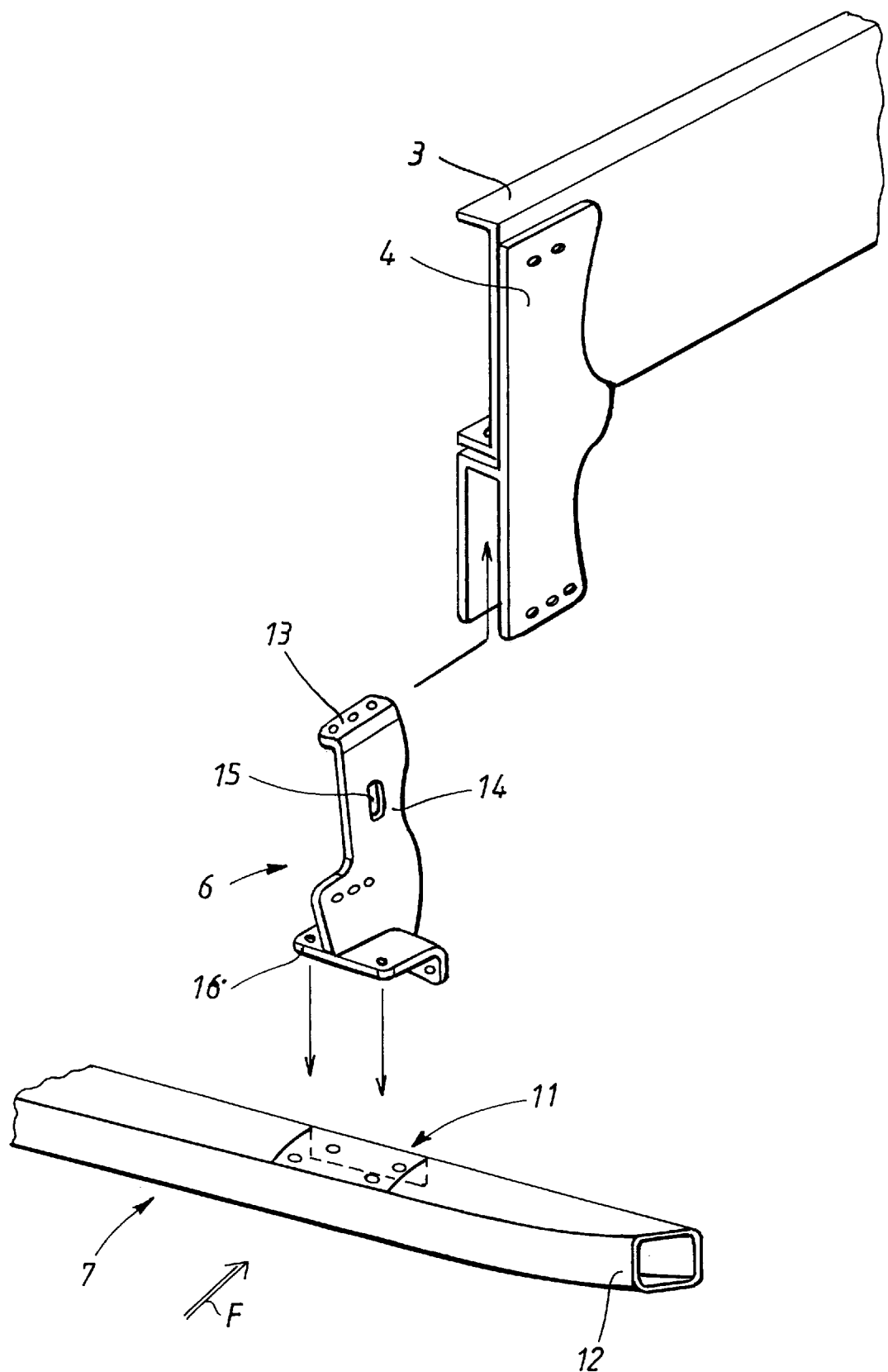
FIG. 2 is an exploded perspective view of the main components according to the present invention.

FIG. 2 is an exploded perspective view, which in a somewhat simplified manner shows the design of the crossbeam 7 and the energy-absorbing consoles 6. This drawing only shows one of the consoles 6 and part of the crossbeam 7. Both of the consoles are, however, arranged in the same manner. Each of the consoles 6 is preferably manufactured from boron steel, and is arranged by means of a bolted joint in an attachment 11, close to the end 12 of the crossbeam 7. Furthermore, each console comprises an upper section 13, which preferably consists of a rigid attachment portion which is intended to be attached to each frame beam 3 (of which only one frame beam can be seen from FIG. 2) by means of a bolted joint. The high degree of rigidity of the upper section 13 is preferably obtained by the hardening of this part. The attachment to the frame beam 3 is made by means of the above-mentioned chassis console 4, which is shaped with a cross section which essentially looks like the letter "h". During assembly, the upper part of the console 6 is moved into the chassis console 4 as shown by an arrow in FIG. 2. The console 6 and the chassis console 4 are arranged at the frame beam 3 by means of (not shown) through-going screws, which extend both through the consoles 6 and the chassis console 4.

When exposed to a force F, the crossbeam 7 will be affected so that force propagates to each of the consoles 6. If the force is sufficiently large, the consoles 6 will be deformed and bent backwards. For this purpose, the mid-section of the console 6 is shaped with a waist 14, which comprises a hole 15, which constitutes an area of weakening at which the console 6 can be bent when exposed to a force. The lower part of each energy-absorbing console 6 is shaped as an oblique portion 16, whose form is adjusted to each of the attachments 11 of the crossbeam 7.

It should be pointed out that FIG. 2 does not show the spring attachment 9 or the spring 10 (see FIG. 1).

FIG. 3 is a side view of the arrangement according to the present invention, which illustrates the fact that the energy-absorbing console 6 is fixedly arranged at the frame beam 3 by means of a bolted screw 17 in the upper section 13 of the console 6. Additionally, the console 6 is connected to the chassis console 4 by a further bolted joint 18. The chassis console 4 is, in turn, also connected to the frame beam 3. In the event of a collision, the crossbeam 7 will be affected by a force F, which propagates to the energy-absorbing console 6. The console 6 is dimensioned to withstand the stresses which correspond to a pressure up to a predetermined threshold value (for example a pressure of 16 tons straight into the crossbeam 7). As has been described above, considerably much larger forces can occur in certain kinds of accidents. According to the present invention, the bolted joint 18 between the console 6 and the chassis console 4 is dimensioned so that it is torn apart in case of stresses which exceed the threshold value. Furthermore, the energy-absorbing console 6 is dimensioned so that, in the event of such large forces, it will collapse and be deformed through bending while absorbing energy. In order for the deformation to take place in a controlled manner, the hole 15 is arranged to define a weakened part at the waist 14 of the console 6. This weakened part forms a rotational joint for the bending of the console 6. When affected by this force, each of the consoles 6 will be bent backwards in the direction of the position shown by broken lines and with reference numeral 6' in FIG. 3.

Since the upper section 13 is hardened and extremely rigid, and since the waist 14 has been provided with the properties of a softer material, the consoles 6 will be deformed while absorbing energy in a very controlled manner. When affected during a possible collision, the waist 14 will bend somewhat like a hinge around the rotational joint which is formed in the area around the hole 15, while the lower part of the console 6 will be displaced rearwards in the vehicle. This controlled process is primarily obtained by manufacturing the console 6 from boron steel, and by hardening the upper section 13. This, among other things, causes a very sharp transition between the two parts of the console 6 which have different material properties after hardening. The portion of the console 6 which is hardened is shown in FIG. 3 as shaded part 19, which extends downwards as seen from the upper edge of the console 6. Since the console 6 is manufactured from boron steel, the boundary between the hardened part 19 and the non-hardened part of the console 6 can be made extremely sharp, in the order of size of 10 mm.

The threshold at which the console 6 will start to be deformed while absorbing energy can be set by dimensioning the console 6, especially as regards the position and size of the hole 15. When this limit is reached, a bending will thus take place, i.e. a deformation in a controlled manner while energy is absorbed.

When the console 6 and the crossbeam 7 have been moved a certain angle backwards, the rear edge 20 of the console 6' will have moved so far back that it will come into contact with the spring attachment 9 behind the console 6'. The spring attachment 9 consists of a cast element which can withstand extremely large forces. In this manner, a counteracting part is defined, by means of which large forces against the crossbeam 7 can be absorbed. Practical experiments have shown that forces of up to 50 tons can be absorbed with this arrangement.

The present invention thus functions approximately as an energy-absorbing "hinge" without any actual moving parts, except for the lower part of each console 6.

The present invention is not limited to the examples of embodiments described above and in the drawings, but can be varied within the scope of the appended claims. For example, the present invention can in principle also be used as an underrun protection which is arranged at the rear end part of the vehicle or along its sides. Additionally, the amount of energy-absorbing consoles 6 can be one, two or more.

Instead of a single hole 15, two or more holes can be made in the console 6. In an alternative embodiment, a correspondingly weakened portion can be obtained by shaping the waist 14 as a portion which is considerably thinner that the rest of the console 6.

Instead of using an energy-absorbing console 6 with a hardened upper section 13, the console 6 can also be designed using two (or more) pieces of material with different properties and varying degrees of rigidity, which are joined to each other in a suitable manner.

Instead of an existing spring attachment 9, the present invention can also comprise some other type of force-absorbing counteracting part. In an alternative embodiment, such a counteracting part can also be completely omitted.

In a version of the present invention which is suitable for certain kinds of vehicles, each of the chassis consoles 4 can in principle be omitted. In this case, the bumper 5 and the crossbeam 7 can be attached directly to the deformable console 6. However, such a chassis console 4 can advantageously be utilized in many kinds of vehicles for attachment of, for example, the bumper and cab of the vehicle.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. Apparatus for the protection of vehicles having a front and a frame defining a longitudinal direction, said apparatus comprising an impact member and an energy-absorbing member mounting said impact member to said frame at a location corresponding to the expected point of impact of a force generated by a collision, said energy-absorbing member including an upper portion connected to said frame, said upper portion of said energy-absorbing member comprising a hardened portion of said energy-absorbing member, a lower portion comprising a non-hardened portion of said energy-absorbing member, and a boundary area between said upper portion and said lower portion, said boundary area comprising a weakened area of said energy-absorbing member whereby upon said impact said energy-absorbing member is adapted to pivot about said weakened area for deformation of said energy-absorbing member thereabout.

2. The apparatus of claim 1 wherein said weakened area has a predetermined configuration whereby said weakened area deforms only when impacted by a predetermined impact force.

3. The apparatus of claim 1 wherein said energy-absorbing member is adapted to pivot about said weakened area substantially longitudinally across said vehicle.

4. The apparatus of claim 1 wherein said energy-absorbing member comprises a console extending substantially vertically with respect to said vehicle, and said weakened area of said console comprises an aperture extending through said console.

5. The apparatus of claim 1 wherein said energy-absorbing member comprises boron steel.

6. The apparatus of claim 1 wherein said impact member comprises a crossbeam extending substantially across said front of said vehicle.

7. The apparatus of claim 1 including a counteracting member for mounting on said vehicle adjacent to said energy-absorbing member whereby upon a predetermined degree of said deformation said energy-absorbing member contacts said counteracting member.

8. The apparatus of claim 7 wherein said counteracting member comprises a spring for attaching to said vehicle.

\* \* \* \* \*